US010259710B2

(12) United States Patent
Kiemel et al.

(10) Patent No.: US 10,259,710 B2
(45) Date of Patent: Apr. 16, 2019

(54) PROCESS FOR SPONTANEOUS CATALYTIC DECOMPOSITION OF HYDROGEN PEROXIDE

(71) Applicant: Heraeus Deutschland GmbH & Co. KG, Hanau (DE)

(72) Inventors: Rainer Kiemel, Langenselbold (DE); Santiago Casu, Hanau (DE); Martina Kemmer, Kahl (DE); Sascha Stengel, Bad Orb (DE)

(73) Assignee: HERAEUS DEUTSCHLAND GMBH & CO. KG, Hanau (DE)

(*) Notice: Subject to any disclaimer, the term of this patent is extended or adjusted under 35 U.S.C. 154(b) by 0 days.

(21) Appl. No.: 15/647,520

(22) Filed: Jul. 12, 2017

(65) Prior Publication Data
US 2018/0016142 A1    Jan. 18, 2018

(30) Foreign Application Priority Data

Jul. 13, 2016 (EP) .................... 16179142

(51) Int. Cl.
C01B 3/04      (2006.01)
B01J 21/04     (2006.01)
C01B 13/02     (2006.01)
B01J 21/06     (2006.01)
B01J 21/08     (2006.01)
B01J 23/42     (2006.01)
B01J 37/08     (2006.01)
B01J 37/02     (2006.01)

(52) U.S. Cl.
CPC .......... C01B 13/0214 (2013.01); B01J 21/04 (2013.01); B01J 21/063 (2013.01); B01J 21/066 (2013.01); B01J 21/08 (2013.01); B01J 23/42 (2013.01); B01J 37/0203 (2013.01); B01J 37/086 (2013.01); C01B 3/04 (2013.01); Y02E 60/364 (2013.01)

(58) Field of Classification Search
CPC ............................ C01B 13/0214; B01J 23/42
See application file for complete search history.

(56) References Cited

U.S. PATENT DOCUMENTS

| | | | |
|---|---|---|---|
| 3,389,963 A * | 6/1968 | Baumgartner | C01B 13/0214 252/186.24 |
| 9,156,767 B2 * | 10/2015 | Walter | C07C 51/418 |
| 2004/0147394 A1 | 7/2004 | Wagner et al. | |
| 2004/0197252 A1 * | 10/2004 | Parrish | B01D 53/56 423/235 |
| 2011/0044874 A1 * | 2/2011 | Dang | B01D 53/864 423/240 S |
| 2014/0216818 A1 * | 8/2014 | Hagiwara | E21B 7/04 175/61 |

FOREIGN PATENT DOCUMENTS

| | | | | |
|---|---|---|---|---|
| DE | 19522950 A1 * | 1/1997 | | A61L 12/128 |
| EP | 2845642 A1 | 3/2015 | | |
| WO | WO-2014053351 A1 | 4/2014 | | |
| WO | WO-2015033165 A1 * | 3/2015 | | B01J 7/00 |

* cited by examiner

Primary Examiner — Melissa S Swain
(74) Attorney, Agent, or Firm — Blank Rome LLP

(57) ABSTRACT

Process for spontaneous catalytic decomposition of hydrogen peroxide through the use of a fixed-bed catalyst, characterized in that the fixed-bed catalyst was produced through the use of at least one exothermic-decomposing platinum precursor.

14 Claims, No Drawings

PROCESS FOR SPONTANEOUS CATALYTIC DECOMPOSITION OF HYDROGEN PEROXIDE

RELATED APPLICATION

This application claims benefit under 35 U.S.C. § 119(a) to European Patent Application No. 16179142.1, filed Jul. 13, 2016, which is hereby incorporated by reference in its entirety.

The present invention relates to a process for spontaneous catalytic composition of hydrogen peroxide Spontaneous catalytic decomposition of a small volume of a liquid compound proceeding with the rapid formation of a large volume of gaseous compounds can be used for technical applications, for example in gas generator applications or in space and satellite technology (for example for the operation of control jets as one-component fuel or for the operation of hybrid motors as oxygen donor) to name just a few applications.

Being a non-toxic substitute for a previously very common system that utilises the spontaneous catalytic decomposition of hydrazine, the generally known spontaneous catalytic decomposition of hydrogen peroxide and its application, for example, in the a four-mention fields of technology are gaining increasing interest. The spontaneous catalytic decomposition of hydrogen peroxide proceeds exothermic, with temperatures of the oxygen/water vapour mixture thus formed being in the range of, for example, 200 to 1000° C.

The spontaneous catalytic decomposition of hydrogen peroxide producing water vapour and oxygen through the use of platinum-containing fixed-bed catalysts is known, for example, from EP2845642A1.

Said platinum-containing fixed-bed catalysts usually comprise porous catalyst supports whose pore surface comprises at least one catalytically active platinum species. To produce said platinum-containing fixed-bed catalysts, it is customary to use dissolved platinum salts or platinum complex compounds (e.g. platinum nitrate, platinum chlorides) as platinum precursors. The application of a dissolved platinum precursor to the surface of a catalyst support is generally called impregnating. Platinum precursor solutions can be applied to porous catalyst supports by a variety of techniques, such as, e.g., capillary-controlled (incipient wetness) or diffusion-controlled impregnation. Subsequently, the platinum precursors can be affixed by drying on the catalyst support and can then be decomposed to form the catalytically active platinum species by calcination at elevated temperatures.

It is the object of the present invention to provide a process of spontaneous catalytic decomposition of hydrogen peroxide as an improvement over the prior art. The focus in this context is on a potent catalyst to be able to use the process to be devised to decompose a given amount of hydrogen peroxide while forming a gas as rapidly as possible. The faster the spontaneous catalytic decomposition of hydrogen peroxide and associated gas production proceed, the less time there is for the heat released during the decomposition to be dissipated to the surroundings. Accordingly, a rapid spontaneous catalytic decomposition of hydrogen peroxide can assure a relatively high temperature and, associated with it, a relatively high increase in pressure in the oxygen/water vapour mixture right after it is produced. The latter is advantageous in particular for applications, in which a relaxation of compressed gas is used, such as the use in space and satellite technology mentioned above.

The object is met by a process for spontaneous catalytic decomposition of hydrogen peroxide through the use of a fixed-bed catalyst, characterised in that the fixed-bed catalyst was produced through the use of at least one exothermic-decomposing platinum precursor.

The term "exothermic-decomposing platinum precursor" is used herein. The term "exothermic-decomposing" used for reasons of brevity means, in more specific terms: "exothermic-decomposing by the action of heat" or "exothermic-decomposing by thermal action". In other words, the term "exothermic-decomposing platinum precursor" means that the decomposition of the at least one exothermic-decomposing platinum precursor by heat is associated with the release of reaction heat.

In one embodiment, the exothermic decomposition by heat of the at least one exothermic-decomposing platinum precursor can take place in the temperature range from, for example, 50 to 500° C.; in another embodiment, the at least one exothermic-decomposing platinum precursor releases reaction heat upon its thermal decomposition in the temperature range of, for example, 150 to 200° C. Accordingly, said embodiments can be platinum precursors that can be decomposed exothermically in the temperature range of, for example, 50 to 500° C. or, for example, 150 to 200° C.

Whether or not a platinum precursor can be decomposed exothermically can be determined, for example, by means of a DSC measurement (differential scanning calorimetry), for example at a heating rate of 5 or 10° C. per minute. It can be expedient to perform the DSC measurement in an inert gas, for example in nitrogen or argon, in order to prevent possible falsification of the measuring result by the admission of air to the sample of a corresponding platinum precursor. In other respects, a person skilled in the art knowing of a platinum precursor to be measured will select a sample crucible that is chemically inert with respect to a sample thereof, for example a sample crucible made of gold.

In the DSC diagram (heat flow plotted over the temperature), an exothermic decomposition shows an exothermic signal. The opposite is true in case of an endothermic decomposition, i.e. heat is "being consumed" during an endothermic decomposition.

For the purposes of characterisation by means of DSC, solutions of platinum precursors can be dried gently until their weight is constant while preventing decomposition, in particular while preventing decomposition forming a catalytically active platinum species.

Undiluted hydrogen peroxide or an aqueous, for example 50 to >99 percent by weight hydrogen peroxide-containing composition, can be used in the process according to the invention, in particular in the form of a solution. Referring to aqueous solutions, these preferably contain, aside from water and hydrogen peroxide and possibly stabilisers, no other purposely added ingredients. A person skilled in the art can select the hydrogen peroxide concentration as a function of the technical application. In the aerospace and space propulsion industry, it is preferred to work with a hydrogen peroxide concentration in the range of 80 to 100% by weight.

In the process according to the invention, the hydrogen peroxide or the aqueous hydrogen peroxide-containing composition (hereinafter referred to as "hydrogen peroxide" for brevity) is usually added to the fixed bed catalyst rather than the other way around.

Expediently, the addition of the spontaneously decomposing hydrogen peroxide to the fixed-bed catalyst proceeds as rapidly and as uniformly as possible, i.e. it is expedient to contact the hydrogen peroxide with the largest possible fraction of fixed-bed catalyst, preferably with the entire fixed-bed catalyst, in a short period of time. The actual length of said short addition time depends, inter alia, on the volume of hydrogen peroxide to be added and on the addition method and equipment and is on the order of, for example, up to one minute, i.e. each edition usually proceeds continuously without interruption. Referring to a pulsed addition, each individual pulse shall be considered to be a single addition. Examples of suitable methods for addition of the hydrogen peroxide to the fixed-bed catalyst are the spraying of droplets or dosing of a liquid. The spraying can take place, for example, onto or into the fixed-bed catalyst by means of one or more nozzles. The addition of liquid to the fixed-bed catalyst can take place, for example, by means of a pump or pressure pump, whereby it is expedient to use devices that ensure that the hydrogen peroxide is made to contact the fixed-bed catalyst uniformly. One example of a device of this type is a perforated plate effecting the distribution of liquid; with the mechanism of action resembling that of a shower head.

For example, the fixed-bed catalyst can be situated in a hollow cylinder, whereby the hydrogen peroxide is added on one side and is decomposed on the fixed-bed catalyst, and the decomposition gases thus formed exit from the hollow cylinder on the opposite side.

The process according to the invention utilises a fixed-bed catalyst that was produced through the use of at least one exothermic-decomposing platinum precursor. The fixed-bed catalyst comprises one or more porous catalyst supports and at least one catalytically active platinum species and/or one or more porous catalyst supports with at least one catalytically active platinum species or, to rephrase it again, one or more porous catalyst supports, whose pore surface comprises at least one catalytically active platinum species.

The oxidation catalyst can be provided, for example, as a washcoat-coated or uncoated monolith catalyst, as a bulk catalyst or catalyst bed comprising washcoat-coated or uncoated bulk bodies, or as a washcoat-coated metal honeycomb or metal mesh catalyst.

The at least one catalytically active platinum species originates, at least in part, from the at least one exothermic-decomposing platinum precursor or, to be more specific, the platinum of the at least one catalytically active platinum species contained in the fixed-bed catalyst used in the process according to the invention originates, at least in part, for example at a level of 30% or more, preferably completely, from the at least one exothermic-decomposing platinum precursor.

The at least one catalytically active platinum species that originates, at least in part, from the at least one exothermic-decomposing platinum precursor can be generated by exothermic decomposition of the at least one exothermic-decomposing platinum precursor and it can be present as elemental platinum and/or as platinum compound (e.g. platinum oxide) on the porous catalyst support(s) of the fixed-bed catalyst used in the process according to the invention, in particular on the pore surface of the porous catalyst support(s) of the fixed-bed catalyst used in the process according to the invention.

Typical monolith catalysts are based, for example, on a honeycomb body, for example on a honeycomb body made of refractory material or a ceramic honeycomb body, having a multitude of channels arranged next to each other or an open-pore foam structure with hollow spaces that are connected to each other.

In other words, a monolith catalyst can itself be the porous catalyst support and/or can be coated with a washcoat, whereby the washcoat layer contains porous catalyst supports in the form of porous particles. In this context, the at least one catalytically active platinum species can be situated on the pore surface of the porous ceramic honeycomb body and/or of the porous particles in the washcoat layer.

In case of bulk catalysts or catalyst beds, the porous catalyst supports are present as bulk bodies or bulk form bodies (such as, e.g., granules, pellets or extrudates such as cylinders, rings, spheres, cuboids, platelets). The diameters or the sizes of said bulk bodies or bulk form bodies can be in the range of, for example, approximately 0.5 to 30, preferably 0.5 to 20, in particular 0.5 to 15 millimeters. In other words, the bulk bodies or bulk form bodies can themselves be porous catalyst supports and/or can be coated with a washcoat, whereby the washcoat layer contains porous catalyst supports in the form of porous particles. In this context, the at least one catalytically active platinum species can be situated on the pore surface of the porous bulk bodies or bulk form bodies and/or of the porous particles in the washcoat layer, though they commonly are situated, in particular, on the pore surface of the porous bulk bodies or bulk form bodies.

In the case of metal honeycomb or metal mesh catalysts, the metal surface generally is coated with a washcoat, whereby the washcoat layer contains porous catalyst supports in the form of porous particles. The at least one catalytically active platinum species usually is situated on the pore surface of the porous particles in the washcoat layer.

Well known to a person skilled in the art, the term "washcoat" has been mentioned repeatedly herein; one needs to distinguish between a washcoat slurry and a washcoat layer applied from the same. A washcoat slurry is a liquid coating composition, usually in the form of an aqueous suspension that contains, aside from water, porous catalyst support particles with particle sizes in the range of, for example, 2-100 µm.

Concerning the selection of materials for the porous catalyst support particles, the same applies as in the selection of materials for porous catalyst supports, which is illustrated in more detail below.

Washcoat or washcoat slurry can exist in two fundamentally different embodiments.

In the one embodiment, said washcoat suspension can contain one or more noble metal precursors from which catalytically active noble metal species are formed after application, drying and calcination of the washcoat that was previously applied to a substrate. In this context, the noble metal precursor can be contacted to the porous catalyst support particles forming the ingredients of the washcoat by means of one of the impregnating methods mentioned below. In this context, the impregnated porous catalyst support particles can have been produced separately, i.e. can have been impregnated, dried, and calcined, and thus can be incorporated into the washcoat slurry while equipped with catalytically active noble metal species. Alternatively, it is feasible to implement the impregnating step as a process step of the washcoat slurry, whereby the drying and calcination take place only after application of the washcoat slurry, i.e. the catalytically active noble metal species is formed only during the calcination of the washcoat layer applied from the washcoat slurry. In the present invention, the noble metal precursor or precursors and/or the catalytically active noble metal species formed therefrom comprises or is the at least one exothermic-decomposing platinum precursor and/or the at least one catalytically active platinum species formed therefrom during calcination.

In the other embodiment, a washcoat slurry can be formulated to be free of any noble metal precursors and can be applied, dried and calcined as such. For configuring the porous catalyst support particles present in the calcined washcoat layer with catalytically active noble metal species, it is necessary in this context to contact noble metal precursors (usually in the form of an aqueous solution) in a separate process step with the washcoat layer, which is still noble metal-free, but is already calcined, by means of impregnating and to form the catalytically active noble metal species after drying and calcination. In the present invention, the noble metal precursor or precursors and/or the catalytically active noble metal species formed therefrom comprises or is the at least one exothermic-decomposing platinum precursor and/or the at least one catalytically active platinum species formed therefrom during calcination.

It is common to the various types of fixed-bed catalysts that can be used in the process according to the invention that they comprise one or more porous catalyst supports and at least one catalytically active platinum species that originates, at least in part, from the at least one exothermic-decomposing platinum precursor. In other words, it is common to the various types of fixed-bed catalysts that can be used in the process according to the invention that they comprise one or more porous catalyst supports with at least one catalytically active platinum species, whereby the catalytically active platinum species originates, at least in part, from the at least one exothermic-decomposing platinum precursor. Yet in other words, it is common to the various types of fixed-bed catalysts that can be used in the process according to the invention that they comprise one or more porous catalyst supports, whereby the pore surface of the porous catalyst supports comprises at least one catalytically active platinum species that originates, at least in part, from the at least one exothermic-decomposing platinum precursor.

The platinum content of the fixed-bed catalyst used in the process according to the invention is, for example, 0.5 to 200 g per liter of catalyst volume.

Any procedure that is common in the prior art and known to a person skilled in the art can be used for producing porous catalyst supports with at least one catalytically active platinum species, namely contacting of the porous catalyst support(s) to a solution of a platinum precursor, followed by drying and subsequent calcination of the thus impregnated catalyst support(s) while forming the catalytically active platinum species on the porous catalyst support(s). In the case of the present invention, this means that a solution, preferably an aqueous solution, of at least one exothermic-decomposing platinum precursor can be contacted to the porous catalyst support(s). In this context, the at least one exothermic-decomposing platinum precursor can be applied to the porous catalyst support(s). The application of the at least one exothermic-decomposing platinum precursor, also called impregnation, can take place by means of various procedures.

For example, the solution of the at least one exothermic-decomposing platinum precursor can be soaked up into the porous catalyst support(s) driven by capillary forces such that the volume of the solution corresponds approximately to the pore volume of the porous catalyst support(s) (incipient witness method). The porous catalyst support(s) can be dried following the impregnation. Said drying step takes place, preferably, at temperatures in the range of 20 to 150° C. and can serve to affix the at least one exothermic-decomposing platinum precursor on the pore surface. Preferably, at least 90% of the solvent are removed by drying or the impregnated porous catalyst support(s) can just as well be dried until the weight remains constant. After the drying, the impregnated porous catalyst support(s) can be calcined at temperatures in the range of, for example, 150-700° C. The calcination can take place under atmospheric conditions and under inert gas conditions. An exothermic decomposition of the at least one exothermic-decomposing platinum precursor, while forming the at least one catalytically active platinum species, can take place during the calcination. The exothermic decomposition of the at least one exothermic-decomposing platinum precursor to form at least one catalytically active platinum species can take place in part or fully. The drying and the calcination can just as well take place in a common step.

The porous catalyst support(s) can basically consists of any material whose structure is stable at the temperatures of, for example, 200 to 100° C. that occur on the fixed-bed catalyst during ongoing operation during the process according to the invention. In particular, the material of the porous catalyst supports can comprise or consist of refractory materials, for example of ceramic materials. Suitable refractory materials can be selected, for example, from the group consisting of aluminium oxides, titanium dioxide, zirconium oxides, cerium/zirconium mixed oxides, aluminium silicates (e.g. cordierite, mullite), silicon carbides, and silicon nitrides.

Said refractory materials can be present alone or in combination, for example as mixtures. Preferred refractory materials can be selected, for example, from the group of aluminium oxides, for example α- or γ-aluminium oxide. The refractory materials can comprise doping agents. Suitable doping agents can be selected from the group consisting of rare earth metals, transition metals, and alkaline earth metals. In particular, the doping agent can be at least one element selected from the group consisting of La, Ba, Sr, Zr, and Mn. The doping can serve, for example, to increase the temperature resistance of a porous aluminium oxide.

It is essential to the invention that the fixed-bed catalyst used in the process according to the invention was produced through the use of at least one exothermic-decomposing platinum precursor or, in other words and as is evident from what has been explained above, it is essential to the invention that the at least one catalytically active platinum species that is present as elemental platinum and/or as platinum compound (e.g. platinum oxide) on the pore surface of the porous catalyst support(s) was produced, at least in part, through the use of at least one exothermic-decomposing platinum precursor, in particular through the use of a solution thereof, and thus originates, at least in part, from the at least one exothermic-decomposing platinum precursor. It has been evident that fixed-bed catalysts that have been produced through the use of at least one exothermic-decomposing platinum precursor have a stronger catalytic effect in terms of the spontaneous catalytic decomposition of hydrogen peroxide than fixed-bed catalysts that have been produced without the use of exothermic-decomposing platinum precursors. A determination of the catalytic effect can be done in the laboratory using an aqueous, for example, for practical reasons, 10% by weight solution of hydrogen peroxide as test substance by contacting the hydrogen peroxide with the fixed-bed catalyst to be tested and measuring the time for which the decomposition reaction and/or the gas formation proceeds.

The at least one exothermic-decomposing platinum precursor is and/or was used in particular in the form of a solution, specifically in the form of an aqueous solution, for producing the fixed-bed catalyst and/or the porous catalyst support(s) with the at least one catalytically active platinum species.

The at least one exothermic-decomposing platinum precursor can, for example, be exothermic-decomposing platinum compounds selected from the group consisting of simple platinum salts, platinum complex salts, and neutral platinum complexes.

As mentioned above, the at least one exothermic-decomposing platinum precursor can be platinum precursors that can be decomposed exothermically in the temperature range of, for example, 50 to 500° C. or, for example, 150 to 200° C.

In one embodiment, preferred exothermic-decomposing platinum precursors show exclusively exothermic behaviour during their decomposition by heat in the temperature range of, for example, 50 to 500° C. or 150 to 200° C., i.e. the DSC diagram mentioned above shows exclusively exothermic signals in the corresponding temperature range.

In a further embodiment, preferred exothermic-decomposing platinum precursors can be decomposed by heat in the temperature range of, for example, 50 to 500° C. or 150 to 200° C. while releasing gaseous decomposition products.

In yet another further embodiment, preferred exothermic-decomposing platinum precursors can be decomposed by heat in the temperature range of, for example, 50 to 500° C. or 150 to 200° C. while releasing gaseous decomposition products and show exothermic behaviour exclusively.

Examples of preferred exothermic-decomposing platinum precursors include platinum oxalate complexes. Platinum oxalate complexes have been known for a long period of time. Accordingly, Krogmann and Dodel reported the formula $(H_3O)_{1.6}[Pt(C_2O_4)_2]2H_2O$ with platinum at a mean oxidation stage of 2.4 for a platinum oxalate complex in solid-state as early as in 1966. Platinum oxalate complexes are complex compositions that can be produced by reacting $H_2Pt(OH)_6$ with oxalic acid in aqueous solution. Aside from oxalate, the complexes can also contain water. Preferred platinum oxalate complexes and the production thereof are also described, for example, in WO2014/053351 A1, in which in particular platinum (IV) hydroxo acid and oxalic acid are used particularly preferably as starting substances and a suitable stoichiometric ratio is determined in that 1.8 to 2.8 molar equivalents of oxalic acid with respect to platinum in the form of the platinum precursor, i.e. the platinum (IV) hydroxo acid, are added.

It is advantageous that the platinum oxalate complexes can be decomposed exothermically during their calcination while forming, aside from the catalytically active platinum species, basically no residues, in particular, for example, without developing toxic nitrogen oxides.

Commercially available in solution, for example, by HERAEUS by the name of "Pt EA", bis(ethanolammonium) hexahydroxoplatinum $[(HOCH_2CH_2NH_4)_2[Pt(OH)_6]]$, hereinafter abbreviated as "platinum ethanolamine", is another example of a preferred exothermic-decomposing platinum precursor. It can be expedient to use platinum ethanolamine in combination with sugar, for example sucrose, in the production of the fixed-bed catalyst.

During the production of a fixed-bed catalyst that can be used in processes according to the invention and is produced through the use of at least one exothermic-decomposing platinum precursor, such as, for example, platinum oxalate complexes and/or platinum ethanolamine, it is not necessary, but can be expedient, to carry out, after the calcination, a catalyst reduction treatment that is common and known to a person skilled in the art, for example with hydrogen or a mixture of hydrogen/inert gas.

In one embodiment, aside from the at least one exothermic-decomposing platinum precursor, precursors of other metals or noble metals, in particular precursors of palladium, ruthenium and/or rhodium, can also be used and/or have been used for producing the fixed-bed catalyst used in the process according to the invention.

In another embodiment, aside from the at least one exothermic-decomposing platinum precursor, no precursors of other metals or noble metals can be used and/or have been used for producing the fixed-bed catalyst used in the process according to the invention.

In yet another embodiment, aside from the at least one, in particular just one, exothermic-decomposing platinum precursor, no non-exothermic-decomposing platinum precursors can be used and/or can have been used for producing the fixed-bed catalyst used in the process according to the invention, whereby precursors of metals or noble metals other than platinum can be and/or can have been used, though it is preferred for the latter not to be the case. Examples of non-exothermic-decomposing platinum precursors are endothermic-decomposing platinum precursors as well as platinum precursors that show neither exothermic nor endothermic behaviour in the DSC diagram mentioned above.

It is specifically preferred that the fixed-bed catalyst used in the process according to the invention can be and/or can have been produced through the exclusive use of platinum ethanolamine and/or platinum oxalate complexes, i.e. without the use of other precursors either of platinum or of other metals or noble metals.

As mentioned before, the fixed-bed catalyst used in the process according to the invention can be present in the form of one or more of the aforementioned porous catalyst support(s) and fixed-bed catalysts comprising at least one catalytically active platinum species, and can specifically be present in the following embodiments:

- as monolith catalyst, impregnated with a solution of the at least one exothermic-decomposing platinum precursor and calcined while forming the at least one catalytically active platinum species; the monolith as such is the porous catalyst support in this case;
- as monolith catalyst, provided with a washcoat layer calcined while forming the at least one catalytically active platinum species; the porous catalyst support particles inside the washcoat layer that are provided with the at least one catalytically active platinum species are the porous catalyst supports in this case;
- as monolith catalyst, impregnated with a solution of the at least one exothermic-decomposing platinum precursor and calcined while forming the at least one catalytically active platinum species and additionally provided with a washcoat layer calcined while forming the at least one catalytically active platinum species; the monolith as such as well as the porous catalyst support particles inside the washcoat layer that are provided with the at least one catalytically active platinum species are the porous catalyst supports in this case;
- as bulk catalyst or catalyst bed with bulk form bodies, impregnated with a solution of the at least one exothermic-decomposing platinum precursor and calcined while forming the at least one catalytically active platinum species; the bulk form bodies as such are the porous catalyst supports in this case;
- as bulk catalyst or catalyst bed with bulk form bodies, provided with a washcoat layer calcined while forming the at least one catalytically active platinum species; the porous catalyst support particles inside the washcoat layer that are provided with the at least one catalytically active platinum species are the porous catalyst supports in this case;

as bulk catalyst for catalyst bed with bulk form bodies, impregnated with a solution of the at least one exothermic-decomposing platinum precursor and calcined while forming the at least one catalytically active platinum species and additionally provided with a washcoat layer calcined while forming the at least one catalytically active platinum species; the bulk form bodies as such as well as the porous catalyst support particles inside the washcoat layer that are provided with the at least one catalytically active platinum species are the porous catalyst supports in this case;

as metal honeycomb catalyst, provided with a washcoat layer calcined while forming the at least one catalytically active platinum species; the porous catalyst support particles inside the washcoat layer that are provided with the at least one catalytically active platinum species are the porous catalyst supports in this case;

as metal mesh catalyst, provided with a washcoat layer calcined while forming the at least one catalytically active platinum species; the porous catalyst support particles inside the washcoat layer that are provided with the at least one catalytically active platinum species are the porous catalyst supports in this case;

EXAMPLES

The platinum oxalate complexes used in the examples were produced in accordance with WO2014/053351 A1, example 1. The platinum ethanolamine used in the examples is the aforementioned product distributed by HERAEUS.

Example 1 (Production of a Fixed-Bed Catalyst)

40 ml of an aqueous solution of platinum oxalate complexes (5 g Pt in 40 ml of solution) were mixed with 100 g $Al_2O_3$ granulate (diameter approx. 1 mm) in a rolling flask. The granulate was initially dried at 70° C. The thus impregnated and dried granulate was then calcined at 600° C. in a nitrogen atmosphere in a drying cabinet. This was then cooled to room temperature and the material thus obtained was subjected to a two-hour reducing treatment with forming gas (5% by volume hydrogen/95% by volume nitrogen) at 300° C.

Example 2

A fixed-bed catalyst was produced analogous to example 1, whereby an aqueous solution of platinum ethanolamine and sucrose (5 g Pt and 5 g sucrose in 40 ml of solution) was used instead of the solution of platinum oxalate complexes.

Reference Example 3

A fixed-bit catalyst was produced analogous to example 1, whereby an aqueous nitric solution of platinum nitrate (5 g Pt in 40 ml of solution) was used instead of the solution of platinum oxalate complexes.

Example 4 (Test of the Catalytic Activity of Fixed-Bed Catalysts)

200 mg of the fixed-bed catalyst from example 1, 2 or 3 were placed in a piston equipped with a gas outlet. The piston was closed with a perforating membrane and the gas outlet was connected to a facility for monitoring the formation of gas.

Subsequently, a syringe punctured through the perforating membrane was used to add 1 milliliter of a 10% by weight aqueous hydrogen peroxide solution to the fixed-bed catalyst granulate within 1 second. Intensive gas formation commenced immediately. The duration of gas formation was recorded, whereby a clearly perceptible decrease of gas formation (increase of gas volume formed <1 mL per 5 seconds!) was considered to be the end of gas formation to simplify matters. The Table below shows the results obtained.

| Example | Duration of gas formation (seconds) |
|---|---|
| 1 (according to the invention) | 33 |
| 2 (according to the invention) | 16 |
| 3 (reference) | 68 |

The invention claimed is:

1. A process for the catalytic decomposition of hydrogen peroxide, the process comprising:
adding hydrogen peroxide to a fixed bed catalyst; and
catalytically decomposing the hydrogen peroxide,
wherein the fixed bed catalyst comprises one or more porous catalyst supports and at least one catalytically active platinum species, and the fixed-bed catalyst is produced through the use of at least one exothermic-decomposing platinum precursor selected from the group consisting of platinum oxalate complexes and platinum ethanolamine.

2. The process of claim 1, whereby the hydrogen peroxide is undiluted hydrogen peroxide or an aqueous composition containing 50 to 99 percent by weight hydrogen peroxide.

3. The process of claim 1, whereby the addition of hydrogen peroxide to the fixed-bed catalyst takes place within up to one minute.

4. The process of claim 1, whereby the addition takes place by spraying of droplets or by dispensing of liquid.

5. The process of claim 1, whereby the fixed-bed catalyst is a washcoat-coated or uncoated monolith catalyst.

6. The process of claim 1, whereby the platinum content of the fixed-bed catalyst is 0.5 to 200 g per liter of catalyst volume.

7. The process of claim 1, whereby the porous catalyst support(s) comprises or consists of a refractory material.

8. The process of claim 7, whereby the refractory material is selected from the group consisting of aluminium oxides, titanium dioxide, zirconium oxides, cerium/zirconium mixed oxides, aluminium silicates, silicon carbides, silicon nitrides, and any combinations thereof.

9. The process of claim 1, whereby the at least one exothermic-decomposing platinum precursor is used in the form of a solution for producing the fixed-bed catalyst.

10. The process of claim 1, whereby, aside from the at least one exothermic-decomposing platinum precursor, precursors of other metals or noble metals are also used in the production of the fixed-bed catalyst.

11. The process of claim 1, wherein the fixed-bed catalyst is produced without use of precursors having a metal other than platinum.

12. The process of claim 1, wherein the fixed-bed catalyst is produced without the use of non-exothermic-decomposing platinum precursors.

13. The process of claim 1, wherein the fixed-bed catalyst comprises washcoat-coated or uncoated bulk form bodies.

14. The process of claim 1, wherein the fixed-bed catalyst comprises a washcoat-coated metal honeycomb or metal mesh catalyst.

* * * * *